(12) United States Patent
Niemann

(10) Patent No.: US 8,053,950 B2
(45) Date of Patent: Nov. 8, 2011

(54) ULTRASONIC SENSOR AND METHOD FOR THE MANUFACTURE OF AN ULTRASONIC SENSOR

(75) Inventor: Thomas Niemann, Delmenhorst (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 11/899,826

(22) Filed: Sep. 7, 2007

(65) Prior Publication Data

US 2008/0060439 A1 Mar. 13, 2008

(30) Foreign Application Priority Data

Sep. 7, 2006 (DE) .................. 10 2006 041 975

(51) Int. Cl.
*H01L 41/08* (2006.01)
(52) U.S. Cl. ........................................... 310/324
(58) Field of Classification Search .................. 310/334, 310/348, 324, 322, 311, 321, 326, 338; 29/25.35 PZ; 73/632; 367/188
See application file for complete search history.

(56) References Cited

U.S. PATENT DOCUMENTS

| | | | | | |
|---|---|---|---|---|---|
| 4,228,379 | A | * | 10/1980 | Guscott et al. ................ | 310/322 |
| 5,446,332 | A | * | 8/1995 | Rapps et al. .................. | 310/324 |
| 5,648,697 | A | * | 7/1997 | Pirrung et al. ................ | 310/338 |
| 6,318,774 | B1 | * | 11/2001 | Karr et al. ..................... | 293/117 |
| 2007/0017807 | A1 | | 1/2007 | Korthals | |

FOREIGN PATENT DOCUMENTS

| | | |
|---|---|---|
| DE | 43 29 055 | 3/1995 |
| DE | 197 19 519 | 11/1998 |
| DE | 100 23 065 | 8/2001 |
| DE | 10023065 * | 8/2001 |
| DE | 103 04 001 | 8/2004 |
| DE | 103 37 760 | 3/2005 |
| DE | 10 2004 031 310 | 1/2006 |
| EP | 1 443 342 | 8/2004 |
| WO | WO 2005/024451 | 3/2005 |

OTHER PUBLICATIONS

German Search Report and English translation of same.

* cited by examiner

*Primary Examiner* — Thomas Dougherty
*Assistant Examiner* — Karen B Addison
(74) *Attorney, Agent, or Firm* — Collard & Roe, P.C.

(57) ABSTRACT

An ultrasonic sensor with a cylinder-shaped housing whose base forms a diaphragm of the ultrasonic sensor. The diaphragm is manufactured as an independent component and directly mounted in the cylinder-shaped housing. A method for manufacturing the ultrasonic sensor includes the steps of manufacturing the diaphragm and the cylinder-shaped housing separately from each other, and mounting the diaphragm directly in the cylinder-shaped housing.

4 Claims, 1 Drawing Sheet

ULTRASONIC SENSOR AND METHOD FOR THE MANUFACTURE OF AN ULTRASONIC SENSOR

BACKGROUND OF THE INVENTION

The invention relates to an ultrasonic sensor with a cylinder-shaped housing the base of which forms a diaphragm of the ultrasonic sensor. In addition the invention relates to a method for the manufacture of such an ultrasonic sensor. Such ultrasonic sensors are more preferably employed in automobiles and for distance measurements.

Ultrasonic sensors of the type mentioned at the outset are known for example from DE 10 2004 031 310 A1, EP 1 443 342 A1 and WO 2005/024451 A2.

There it is known to use aluminium cups, wherein a piezoelectric sensor is glued to the base from the inside. The base of the aluminium cup then forms an outer aluminium diaphragm which in part is adjusted to the directivity pattern in a grinding process. For contacting the piezoelectric crystals which are formed as piezoelectric disc a cable or lead frame is produced and soldered in manually. The entire cup-shaped sensor element is then cast-embedded. This is then followed by additional contacting with a circuit board circuit and the circuit board and the entire sensor arrangement are inserted in a plastic housing and cast-embedded once more.

Another concept of an ultrasonic sensor is known from DE 100 23 065 B4. Here, a diaphragm is initially held in a diaphragm holder which is held in a housing by way of a carrier element.

SUMMARY OF THE INVENTION

The invention is based on the object of creating an ultrasonic sensor and a method for the manufacture of an ultrasonic sensor of the type mentioned at the outset so that a preferably simple and reliably producible ultrasonic sensor is created.

This object is solved according to the invention with an ultrasonic sensor with a cylinder-shaped housing whose base forms a diaphragm of the ultrasonic sensor. It is essential to the invention that the diaphragm is manufactured as an independent component and directly mounted in the cylinder-shaped housing. Through this construction of the ultrasonic sensor particularly simple manufacture is possible. Additional components can be directly glued. More preferably with this embodiment, grinding of the diaphragm or the base of an aluminium cup need not be subsequently performed. The cylinder-shaped housing and the diaphragm are directly connected with each other and form the housing without transition. More preferably, the diaphragm is not held in a diaphragm holder, but is directly connected with the housing and without intermediate connection of additional components. Altogether it is a cup-shaped component. The diaphragm is preferably a piezo-diaphragm module (PMM). The part of the ultrasonic sensor designated as base can also be designated as lid if viewed the other way round.

The diaphragm is preferably glued in the cylinder-shaped housing, more preferably glued elastically. Simple and easy-to-handle attachment is performed in this manner. On the diaphragm a piezoelectric sensor is attached, more preferably glued. With this piezoelectric sensor which more preferably is designed as piezoelectric disc the diaphragm is excited to vibrations. Here, the size of the disc preferably corresponds approximately to the size of the diaphragm or the diaphragm is preferably slightly larger than the piezoelectric disc. Through the gluing a simple manufacturing step is likewise possible that can be easily checked and controlled. The cylinder-shaped housing is preferably manufactured of plastic. Preferable it is a three-dimensionally injection-moulded circuit carrier. Such circuit carriers are also designated MID carriers (moulded interconnected devices). Such circuit carriers can be further processed in a process-secure manner. Components such as capacitors, resistors and ASIC's can be directly glued and bonded on the cylinder-shaped component formed in this way. Contacting to a sensor substrate is performed through a thin wire bond.

Preferably a metallic ring is provided in the cylinder-shaped housing adjoining the diaphragm. This ring serves for screening, i.e. more preferably to establish electromagnetic compatibility (EMC). The width of the ring preferably corresponds approximately to the diameter of the diaphragm. Preferably the metallic ring is arranged on the inside of the cylinder-shaped housing. Although the screen could also be achieved through a metallic ring arranged on the outside, the metallic ring is preferred in the interior however. The outer plane then acts as insulator. Preferably the metallic ring consists of metallizing directly applied to the cylinder-shaped component. The diaphragm preferably consists of a thin metal disc which can be manufactured in a process-secure manner more preferably with a view to the wall thickness to be manufactured in a defined manner. The diaphragm or the metal disc is preferably coated subsequently or is capable of being coated. The diaphragm can for instance be subsequently painted.

In addition, the invention also relates to a motor vehicle and also to a body part with an ultrasonic sensor described above. More preferably, the invention relates to a motor vehicle with an ultrasonic sensor having a cylinder-shaped body the base of which forms a diaphragm of the ultrasonic sensor and wherein the diaphragm is manufactured as independent component and mounted in the cylinder-shaped housing. Reference is made to the further developments described above. The ultrasonic sensor is preferably arranged in a bumper.

Another aspect of the invention consists in the provision of a method for the manufacture of an ultrasonic sensor with a cylinder-shaped housing the base of which forms a diaphragm of the ultrasonic sensor, wherein it is essential to the invention that the diaphragm and the cylinder-shaped housing are manufactured separately from each other and the diaphragm is directly mounted in the cylinder-shaped housing.

Preferably the diaphragm is connected in a first step with the piezoelectric sensor, more preferably a piezodisc, more preferably glued elastically. After this, the manufactured assembly consisting of the diaphragm and the piezodisc attached to said diaphragm is mounted to the circular recess of the cylinder-shaped component. The diaphragm is preferably likewise formed as circular disc. In the cylinder-shaped component the printed conductors are applied prior to the installation of the diaphragm. The metallic ring is preferably applied in the same manner as the printed conductors. This can for example take place through hot-stamping or other structuring methods.

BRIEF DESCRIPTION OF THE DRAWINGS

In the following the invention is further explained by means of a preferred exemplary embodiment presented in the drawing. In the schematic representations it individually shows.

DETAILED DESCRIPTION OF THE PREFERRED EMBODIMENT

Figure 1:
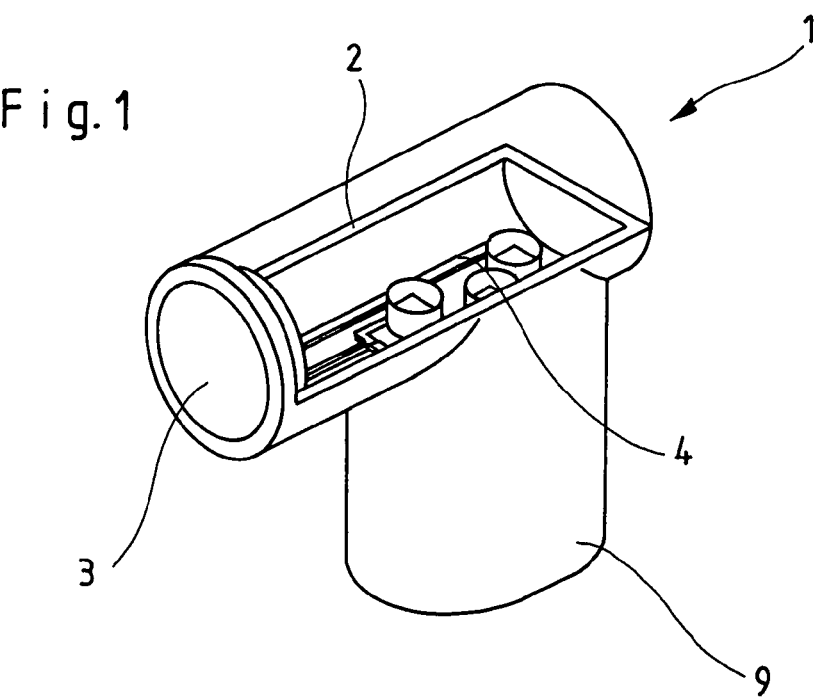
FIG. 1: a perspective local section view of an ultrasonic sensor according to the invention.

A perspective view of an ultrasonic sensor 1 according to the invention is shown in FIG. 1. The ultrasonic sensor substantially has a cylinder-shaped housing 2 on the front face of which the diaphragm 3 formed as metal disc is arranged or inserted. The cylinder-shaped housing 2 also has a connector cage 9 manufactured as one piece with said housing in which pins are provided. The cylinder-shaped housing 2 and the connector cage 9 are jointly formed as MID assembly. Printed conductors 4 are pre-structured in the cylinder-shaped housing. In the front circular aperture of the cylinder-shaped housing 2 the diaphragm 3 is inserted, more preferably glued there. The diaphragm has previously been manufactured with defined wall thickness and glued together with a piezodisc and then glued in the ultrasonic sensor.

Figure 2:
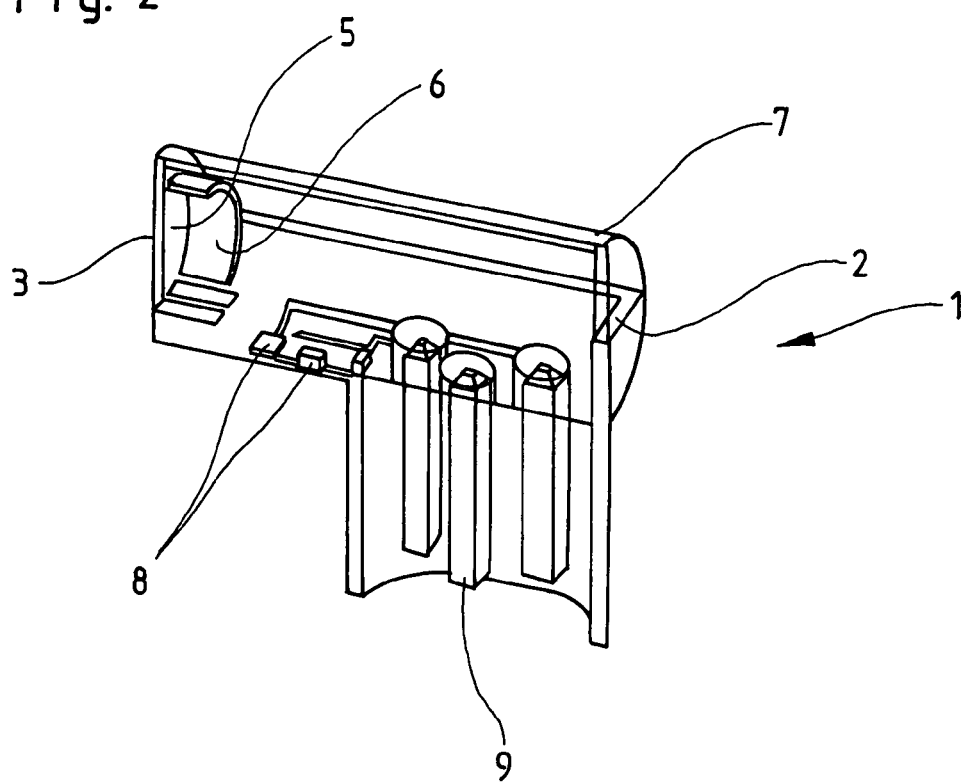
FIG. 2: a second perspective local section view of an ultrasonic sensor according to the invention.

The ultrasonic sensor 1 is shown in a second view in FIG. 2. There it is evident that at the back of the diaphragm 3 a piezoelectric crystal, more preferably in form of a piezodisc 5, is glued to the diaphragm. Immediately following the diaphragm a ring-shaped metallization 6 or a metallic ring is provided in the interior of the cylinder shaped housing 2. This serves for the screening of electromagnetic radiation or the electromagnetic compatibility (EMC). The width of the ring 6 approximately corresponds to the diameter of the diaphragm 3. In the cylinder-shaped housing 2 electronic components 8 are arranged for example such as capacitors, resistors and ASIC's which are glued there and bonded to the printed conductors. Contacting with the sensor substrate is performed through a thin wire bond. After this, a cast, for example a duroplast cast 7 can be provided to protect the components. Adjustment is then performed via the amplifier circuit in the ASIC.

What is claimed is:

1. An ultrasonic sensor with a cylinder-shaped housing having a base that forms a diaphragm of the ultrasonic sensor,
    wherein the diaphragm is manufactured as an independent component and is directly attached to the cylinder-shaped housing;
    wherein the cylinder-shaped housing is a three-dimensionally injection-moulded circuit carrier;
    wherein the cylinder-shaped housing has a connector cage manufactured as one piece with said housing in which pins are provided;
    wherein the cylinder-shaped housing and the connector cage are jointly formed as MID (Moulded interconnected devices) assembly, and
    wherein printed conductors are pre-structured in the cylinder-shaped housing.

2. An ultrasonic sensor with a cylinder-shaped housing having a base that forms a diaphragm of the ultrasonic sensor,
    wherein the diaphragm is manufactured as an independent component and is directly attached to the cylinder-shaped housing;
    wherein the cylinder-shaped housing has a metallic ring adjacent to the diaphragm;
    wherein the cylinder-shaped housing is a three-dimensionally injection-moulded circuit carrier;
    wherein the cylinder-shaped housing has a connector cage manufactured as one piece with said housing in which pins are provided;
    wherein the cylinder-shaped housing and the connector cage are jointly formed as MID (Moulded interconnected devices) assembly, and
    wherein printed conductors are pre-structured in the cylinder-shaped housing.

3. A motor vehicle with an ultrasonic sensor having a cylinder-shaped housing having a base that forms a diaphragm of the ultrasonic sensor,
    wherein the diaphragm is manufactured as an independent component and is directly attached to the cylinder-shaped housing;
    wherein the cylinder-shaped housing is a three-dimensionally injection-moulded circuit carrier;
    wherein the cylinder-shaped housing has a connector cage manufactured as one piece with said housing in which pins are provided;
    wherein the cylinder-shaped housing and the connector cage are jointly formed as MID (Moulded interconnected devices) assembly, and
    wherein printed conductors are pre-structured in the cylinder-shaped housing.

4. A method for manufacturing an ultrasonic sensor with a cylinder-shaped housing having a base that forms a diaphragm of the ultrasonic sensor, comprising the steps of:
    manufacturing the diaphragm and the cylinder-shaped housing separately from each other and
    attaching the diaphragm directly to the cylinder-shaped housing;
    wherein a metallic ring is established in the cylinder-shaped housing jointly with printed conductors, adjacent to an opening provided for the diaphragm;
    wherein the cylinder-shaped housing has a connector cage manufactured as one piece with said housing in which pins are provided;
    wherein the cylinder-shaped housing and the connector cage are jointly formed as MID (Moulded interconnected devices) assembly, and
    wherein printed conductors are pre-structured in the cylinder-shaped housing.

* * * * *